(12) United States Patent
Fujisaki et al.

(10) Patent No.: US 10,288,493 B2
(45) Date of Patent: May 14, 2019

(54) SEMICONDUCTOR INTEGRATED CIRCUIT AND ELECTRONIC CONTROL UNIT

(71) Applicant: Renesas Electronics Corporation, Tokyo (JP)

(72) Inventors: Toshiro Fujisaki, Tokyo (JP); Takatoshi Tamaoki, Tokyo (JP); Akira Murayama, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 300 days.

(21) Appl. No.: 15/198,663

(22) Filed: Jun. 30, 2016

(65) Prior Publication Data

US 2017/0059416 A1 Mar. 2, 2017

(30) Foreign Application Priority Data

Aug. 28, 2015 (JP) ................................ 2015-168687

(51) Int. Cl.
*G01K 3/04* (2006.01)

(52) U.S. Cl.
CPC ..................... *G01K 3/04* (2013.01)

(58) Field of Classification Search
CPC ........................................................ G01K 3/04
USPC ............................................................ 374/10
See application file for complete search history.

(56) References Cited

U.S. PATENT DOCUMENTS

| 7,034,569 | B1* | 4/2006 | Balasubramanian .. G01K 7/015 326/38 |
| 8,061,894 | B2* | 11/2011 | Nishimura ............. G01K 7/015 374/170 |
| 8,970,410 | B2* | 3/2015 | Kawakami .......... H03M 1/1225 341/141 |
| 9,013,932 | B1* | 4/2015 | Lee .......................... G11C 7/04 365/189.09 |
| 9,344,101 | B2* | 5/2016 | Ueki ...................... H03M 1/002 |
| 9,389,127 | B2* | 7/2016 | Kameyama .............. G01K 7/01 |
| 9,647,654 | B2* | 5/2017 | Kameyama .............. H03K 5/24 |
| 2009/0150101 | A1* | 6/2009 | Itagaki ............... G01R 31/3648 702/63 |
| 2017/0059416 | A1* | 3/2017 | Fujisaki ................... G01K 3/04 |
| 2018/0156675 | A1* | 6/2018 | Kumahara ........... G01K 15/007 |

FOREIGN PATENT DOCUMENTS

JP 11-249748 A 9/1999

* cited by examiner

*Primary Examiner* — Yaritza Guadalupe
(74) *Attorney, Agent, or Firm* — McDermott Will & Emery LLP

(57) ABSTRACT

In order to provide a semiconductor integrated circuit capable of predicting its own lifetime (wear out failure) due to the aged deterioration and notifying a warning, it includes a processor, a temperature sensor, a non-volatile memory, and a comparator formed on the same semiconductor substrate. The comparator compares a temperature measured by the temperature sensor with a predetermined temperature threshold, and the non-volatile memory accumulatively holds the information (cumulative time) about a period having the temperature exceeding the temperature threshold. The semiconductor integrated circuit notifies the outward of a warning when the cumulative time having the temperature exceeding the temperature threshold exceeds a predetermined high temperature time threshold.

16 Claims, 15 Drawing Sheets

SEMICONDUCTOR INTEGRATED CIRCUIT AND ELECTRONIC CONTROL UNIT

CROSS-REFERENCE TO RELATED APPLICATIONS

The disclosure of Japanese Patent Application No. 2015-168687 filed on Aug. 28, 2015 including the specification, drawings and abstract is incorporated herein by reference in its entirety.

BACKGROUND

The invention relates to a semiconductor integrated circuit and an electronic control unit and particularly it can be preferably applied to a microcontroller (hereinafter, occasionally referred to as an MCU) that is a semiconductor integrated circuit mounted on an electronic control unit (ECU: Electronic Control Unit) requiring a high reliability.

In the semiconductor integrated circuits such as MCU, the temperature with the normal operation assured is defined by a junction temperature Tj of a semiconductor in many cases. In an electronic control unit for controlling an MCU-mounted vehicle, especially when the electronic control unit is an engine control unit and set in an engine room getting extremely hot, the operation temperature of the mounted MCU is controlled not to deviate from the assured range of the normal operation.

Japanese Unexamined Patent Application Publication No. Hei 11(1999)-249748 discloses a technique of suppressing the operation of MCU depending on the measured temperature Ta in order that a surrounding temperature Ta (atmosphere temperature) within the electronic control unit may be less than the temperature of the upper limit in which the MCU can operate stably, in order to avoid overheating of the MCU including thermal influence from the surrounding. A chip thermistor within the engine control unit is used to measure the temperature Ta, feed back the measurement result to the MCU, to reduce the operation temperature of the MCU itself, by means of software. The MCU uses a Central Processing Unit (CPU) to check the information of the temperature Ta after conversion of a signal input from the chip thermistor in an A/D converter in a way of software, and under the temperature situation where the operation gets unstable, by reducing the oscillation frequency of the system clock of the MCU in a clock control circuit, heat generation of the MCU itself is reduced.

As the result of examination of the above patent publication by the inventor et al., the following problems are found newly.

The related technique including the technique disclosed in the above patent publication is a technique for controlling the operation temperature of a semiconductor integrated circuit such as MCU not to deviate from the assured range of the normal operation, but no consideration is taken to a lifetime due to aged deterioration (wear out failure). When a semiconductor integrated circuit deviates from the assured range of the normal operation, the normal function and property cannot be assured but it does not necessarily come to a failure in an instant. On the other hand, even in the temperature range with the normal operation assured, the cumulative operating time comes to a wear out failure, and out of the above temperature range, even if the operation stops, it is found that the cumulative time of deviating from the temperature range comes to a wear out failure. For example, an MCU mounted on an engine control unit for vehicle can be exposed to a high temperature environment, being set in the engine room as mentioned above. Further, during the battery charge of a hybrid vehicle, the engine stops and the MCU of the engine control unit stops the operation; however, the temperature of the MCU could be in a situation of a high temperature. It is found that the accumulation of this state causes a wear out failure.

As mentioned above, the operation of the semiconductor integrated circuit should be assured to be free from the wear out failure, in addition to the assurance of the normal operation. Here, the assurance of the operation means a function of informing a user that on the assumption that the circuit would naturally come to the wear out failure, it is in a usable period before the wear out failure.

The inventor et al. have examined the application of the temperature monitoring function disclosed in the above patent application to a technique of predicting a lifetime due to the aged deterioration; however, the following problems are found. The temperature monitoring function for assuring the normal operation operates only when the semiconductor integrated circuit is operating and while it stops the operation, it cannot monitor the temperature. Further, although it can monitor the temperature, it cannot do more than judge whether or not the temperature at that time exceeds the assurance range, which is not proper to predict the lifetime.

Means for solving the problems will be described later and other problems and novel characteristics will be apparent from the description and the attached drawings of this specification.

According to one embodiment, a semiconductor integrated circuit is provided as follows.

It includes a processor, a temperature sensor, a non-volatile memory, and a comparator formed on the same semiconductor substrate. The comparator compares a temperature measured by the temperature sensor with a predetermined temperature threshold, and the non-volatile memory accumulatively holds the information about a period with the temperature exceeding the temperature threshold. The semiconductor integrated circuit notifies the outward of a warning when the cumulative value of the period having the temperature exceeding the temperature threshold exceeds a predetermined high temperature time threshold.

According to the above form of the embodiment, the following effect can be obtained.

It is possible to provide a semiconductor integrated circuit (for example, MCU) capable of predicting its own lifetime (wear out failure) due to the aged deterioration and notifying a warning.

DETAILED DESCRIPTION

Embodiments will be described in details. In all the drawings for use in describing the invention, the same codes are attached to the elements having the same functions and their repeated description is omitted.

First Embodiment

Figure 1:
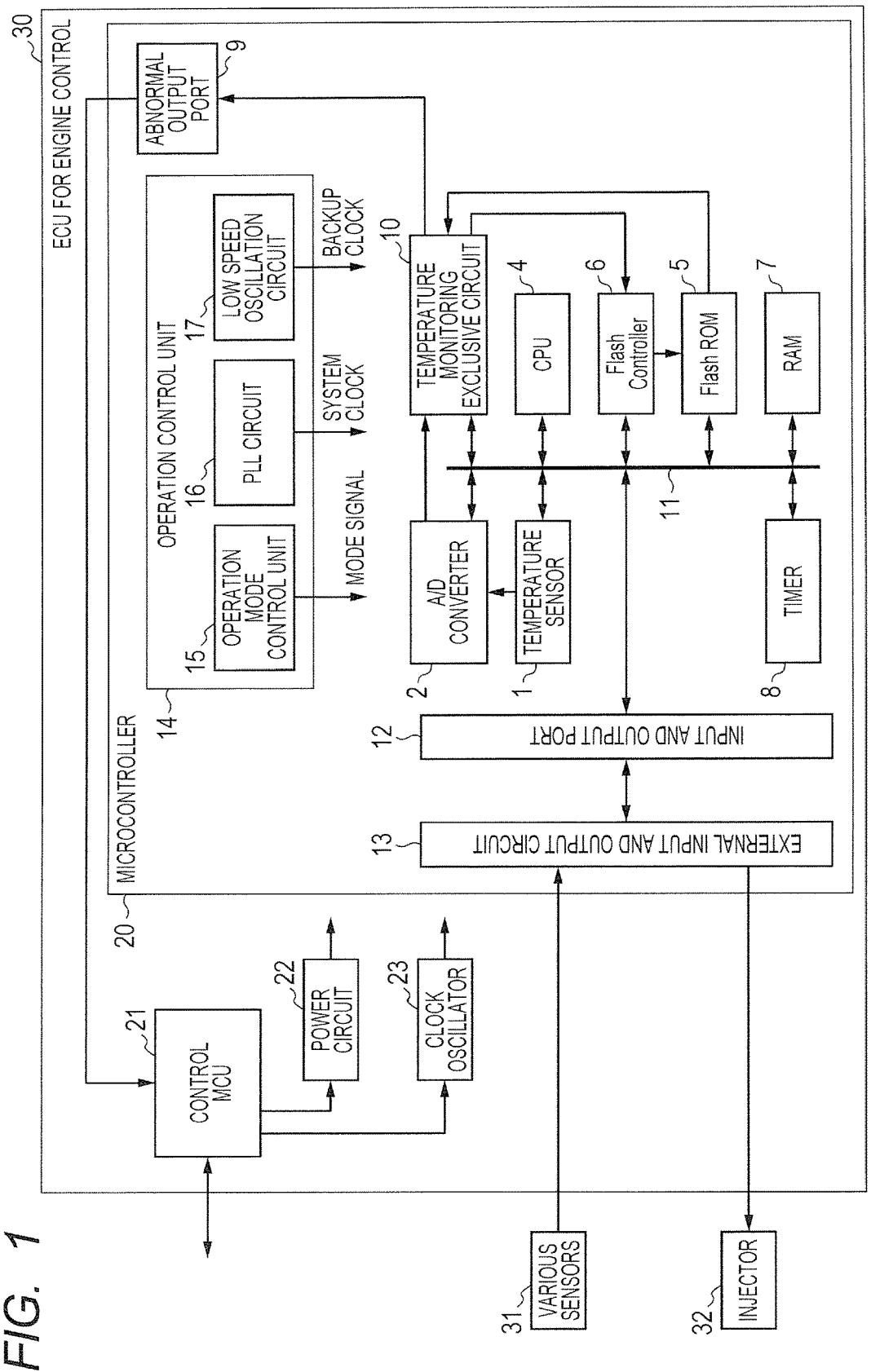
FIG. 1 is a block diagram showing a schematic structure example of MCU and ECU according to each embodiment.

FIG. 1 is a block diagram showing a schematic constitutional example of an MCU 20 and an ECU 30 according to each embodiment. The ECU 30 is, for example, an ECU for controlling an engine, coupled to various types of sensors 31 and an injector 32, and includes the MCU 20, a control MCU 21 for controlling the MCU 20, a power circuit 22 for supplying power to the ECU 30, and a clock oscillator 23 for supplying a clock signal. The wiring in the drawings is formed by any number of signal lines, one signal line or a plurality of single lines and in the drawings, a so-called vector notation is omitted. This is true to the other drawings in this specification.

The MCU 20 includes a CPU 4, a Flash ROM 5 that is a non-volatile memory, a non-volatile memory control unit (Flash Controller) 6, a RAM 7 for temporarily storing data, and a bus 11 for mutually coupling these. Other than that, it includes a timer 8, an A/D converter 2, a temperature sensor 1, an input and output port 12, an external input and output circuit 13, and an operation control unit 14. The operation control unit 14 includes an operation mode control unit 15 for supplying an operation mode signal, a PLL circuit 16 for supplying a system clock, and a low speed oscillation circuit for supplying a backup clock. The above is to show the structure of the general microcontroller and it may further include another function block. Although the drawing and the detailed description are omitted, it may include an interruption control circuit and a direct memory controller, or it may include a cache memory with the bus 11 hierarchized.

The MCU 20 further includes a temperature monitoring exclusive circuit 10 and an abnormal output port 9. The structure and the operation of the temperature monitoring exclusive circuit 10 will be described in each embodiment; generally, upon receipt of a temperature measured by the temperature sensor 1 and various kinds of thresholds from the Flash ROM 5, the circuit 10 can notify the control MCU 21 outside the MCU 20 of a warning through the abnormal output port 9 and rewrite a value to the Flash ROM 5 through the non-volatile memory control unit 6. Here, the Flash ROM 5 is a non-volatile memory and the data read from the specified address is supplied to the CPU 4 as a program. Further, a trimming parameter is kept in the above, read by a power up sequence after turning on power, and set in a register. By setting the parameter in the register, the value can be always referred to not only at the access to the Flash ROM 5. A temperature threshold described later and a high temperature time threshold are controlled similarly to the trimming parameter.

The operation when the ECU 30 is an ECU for engine control will be described. Signals of measurement values from the various sensors 31 of an engine are read into the MCU through the external input and output circuit 13 and the input and output port 12 as the input values. When the signals of the measurement values from the sensors 31 are analog signals, although the signal wiring is not illustrated, they are input to the A/D converter 2 through the external input and output circuit 13 and read into the MCU as the A/D (from analog to digital) converted input values. The A/D converted input values are processed by a program executed by the CPU 4; as one example, they are supplied to the timer 8, where the fuel injection amount and the ignition timing are calculated, and a control signal corresponding to the data is output to the injector 32. Based on the output control signal, fuel is injected from the injector 32 to the engine.

The ECU 30 including the MCU 20 is often set in an engine room near a heat generation source such as an engine and easily affected by the heat source. In this case, considering a high temperature of the atmosphere temperature Ta and an increase in the self heat generation temperature caused by the improvement in performance of the MCU 20 itself, temperature control in the ECU 30 becomes very important in order to secure the normal operation and reliability of the MCU 20. In each embodiment of the specification, based on a warning notified the control MCU 21 from the abnormal output port 9, the control MCU 21 is enabled to properly control the power and the clock supplied to the MCU 20 through the power circuit 22 and the clock oscillator 23. A method of controlling the operation of the MCU 20 based on the warning is arbitrary and changeable variously. Further, the similar solving means would effectively work on any device other than the ECU for engine control that could be set in the same environment.

Figure 2:
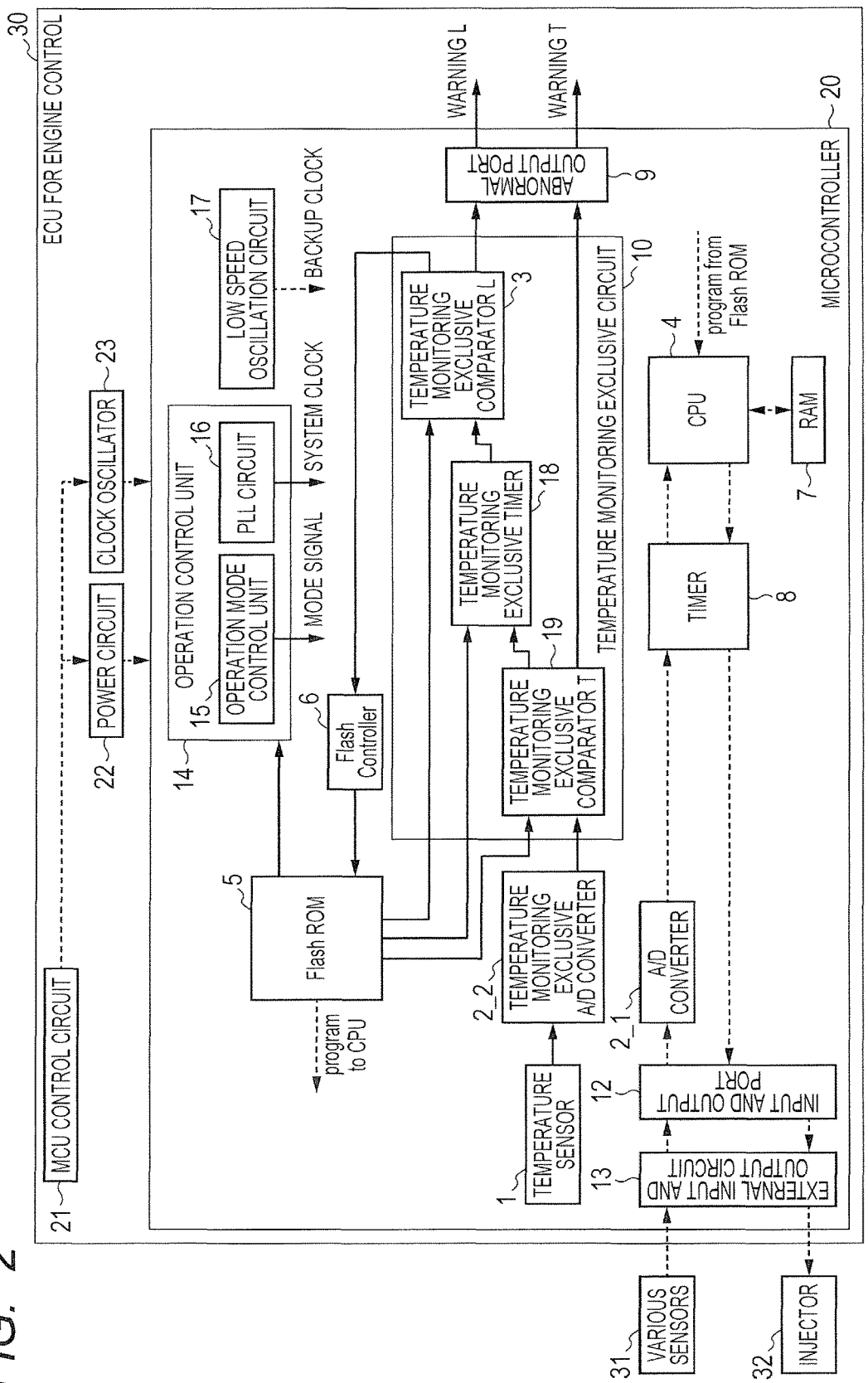
FIG. 2 is a signal flow view showing an operation example of the MCU and ECU according to a first embodiment.

FIG. 2 is a signal flow view showing an operation example of the MCU 20 and the ECU 30 according to the first embodiment. Each component shown in each block is the same as that of each block shown in FIG. 1. However, the A/D converter 2 shown in FIG. 1 includes an A/D converter 2_1 and a temperature monitoring exclusive A/D converter 2_2 as a peripheral circuit of the CPU 4 in FIG. 2. Although the detail is not shown in FIG. 1, the temperature monitoring exclusive circuit 10 includes a temperature monitoring exclusive comparator T 19, a temperature monitoring exclusive timer 18, and a temperature monitoring exclusive comparator L 3 in FIG. 2 as an example. In FIG. 2, an arrow connecting the blocks shows a flow of signal. Here, the solid arrow indicates a flow of signal concerned to the temperature monitoring and the dashed arrow indicates a flow of other general signals. This is true to the other signal flow views (FIGS. 5, 8, 9, 12, and 13).

As indicated by the dashed arrow, signals of the measurement values from various sensors 31 are input to the A/D converter 2_1 through the external input and output circuit 13 and the input and output port 12 and the A/D converted input values are read by the timer 8. Executing a program supplied from the Flash ROM 5, the CPU 4 processes the output values from the timer 8, by temporarily storing intermediate data in the RAM 7, and calculates a control value of the injector 32, to control the injector 32 through the input and output port 12 and the external input and output circuit 13. Here, the MCU control circuit 21 controls the power circuit 22 and the clock oscillator 23, to supply a power and a clock to the MCU 20. The MCU control circuit 21 works as a function of especially controlling the MCU 20, of the functions mounted as software to be performed by the control MCU 21 of FIG. 1.

The temperature monitoring operation indicated by the solid arrow will be described. The temperature measured by the temperature sensor 1 is converted into digital value by the temperature monitoring exclusive A/D converter 2_2 and input to the temperature monitoring exclusive comparator T 19 in the temperature monitoring exclusive circuit 10. A temperature threshold is input from the Flash ROM 5 to the other input terminal of the temperature monitoring exclusive comparator T 19. As the comparison result, when the temperature measured by the temperature sensor 1 exceeds the temperature threshold, a flag is notified to the temperature monitoring exclusive timer 18, and at the same time, a high temperature detection signal is notified through the abnormal detection port 9 outward to the MCU control circuit 21 as a warning T. Upon notification of the warning T of a high temperature detection signal, the MCU control circuit 21 suppresses the operation of the MCU 20 by means of reducing the frequency of the clock signal supplied to the MCU 20 similarly to the conventional technique and reduces the heat generation in the MCU 20 itself, thereby making it possible to control the MCU 20 not to exceed the temperature range with the normal operation assured. When the temperature measured by the temperature sensor 1 is less than the temperature threshold, the flag is dismissed, the measurement operation of the temperature monitoring exclusive timer 18 is stopped, and the warning T is cancelled.

On the other hand, upon notification of the flag, the temperature monitoring exclusive timer 18 measures the period (high temperature period) with the flag notified. This high temperature period is a cumulative time starting from the shipment of the MCU 20. When the period of being exposed to a high temperature to that point is supplied from the Flash ROM 5 and a flag is notified from the temperature monitoring exclusive comparator T 19, the above timer 18 performs the measurement operation to accumulatively add the period with the flag notified to the high temperature period in the past supplied from the Flash ROM 5. The measured period is input to the temperature monitoring exclusive comparator L 3. To the other input terminal of the temperature monitoring exclusive comparator L 3, a high temperature time threshold is supplied from the Flash ROM 5. When the cumulative measurement period output from the temperature monitoring exclusive timer 18 exceeds the high temperature time threshold, a cumulative time excessive signal is notified through the abnormal detection port 9 outward to the MCU control circuit 21 as a warning L. The warning L (cumulative time excessive signal) is to warn that the lifetime due to the aged deterioration comes close to the end or that a wear out failure may happen in the near future. The high temperature time threshold is previously calculated through experiment or simulation, based on a power cycle test, or calculated logically, and stored in the Flash ROM 5. In the notification of the warning L (cumulative time excessive signal), for example, even when the temperature measured by the temperature sensor 1 does not exceed the temperature threshold, by reducing the frequency of the clock signal supplied to the MCU 20, the operation of the MCU 20 can be suppressed and the heat generation in the MCU 20 itself can be reduced, thereby prolonging the period actually coming to the wear out failure.

Further, in the notification of the warning L (cumulative time excessive signal), the information indicating the same may be preferably written in the Flash ROM 5 as a flag. Also when the ECU 30 temporarily stops the operation and the temperature gets lower, the warning L (cumulative time excessive signal) is effective and when the power is turned on again to resume the operation, the same warning L (cumulative time excessive signal) can be notified again. Based on the flag stored in the Flash ROM 5, the operation of the MCU 20 can be suppressed and the operation restriction for reducing the heat generation by the MCU 20 itself can be continued. For example, the flag can be read from the Flash ROM 5 and notified the operation control unit 14, hence to perform the operation restriction on the MCU 20.

It is preferable that the high temperature period accumulatively measured by the temperature monitoring exclusive timer 18 is periodically rewritten into the Flash ROM 5 during the measurement operation. When the operation of the ECU 30 suddenly stops according to the engine stop at parking, the cumulative high temperature period (cumulative time) so far is held in the Flash ROM 5 and therefore, generation of measurement error can be suppressed to the minimum. Alternatively, when the temperature measured by the temperature sensor 1 is less than the temperature threshold, it may be designed to rewrite the above period into the Flash ROM 5.

Figure 3:
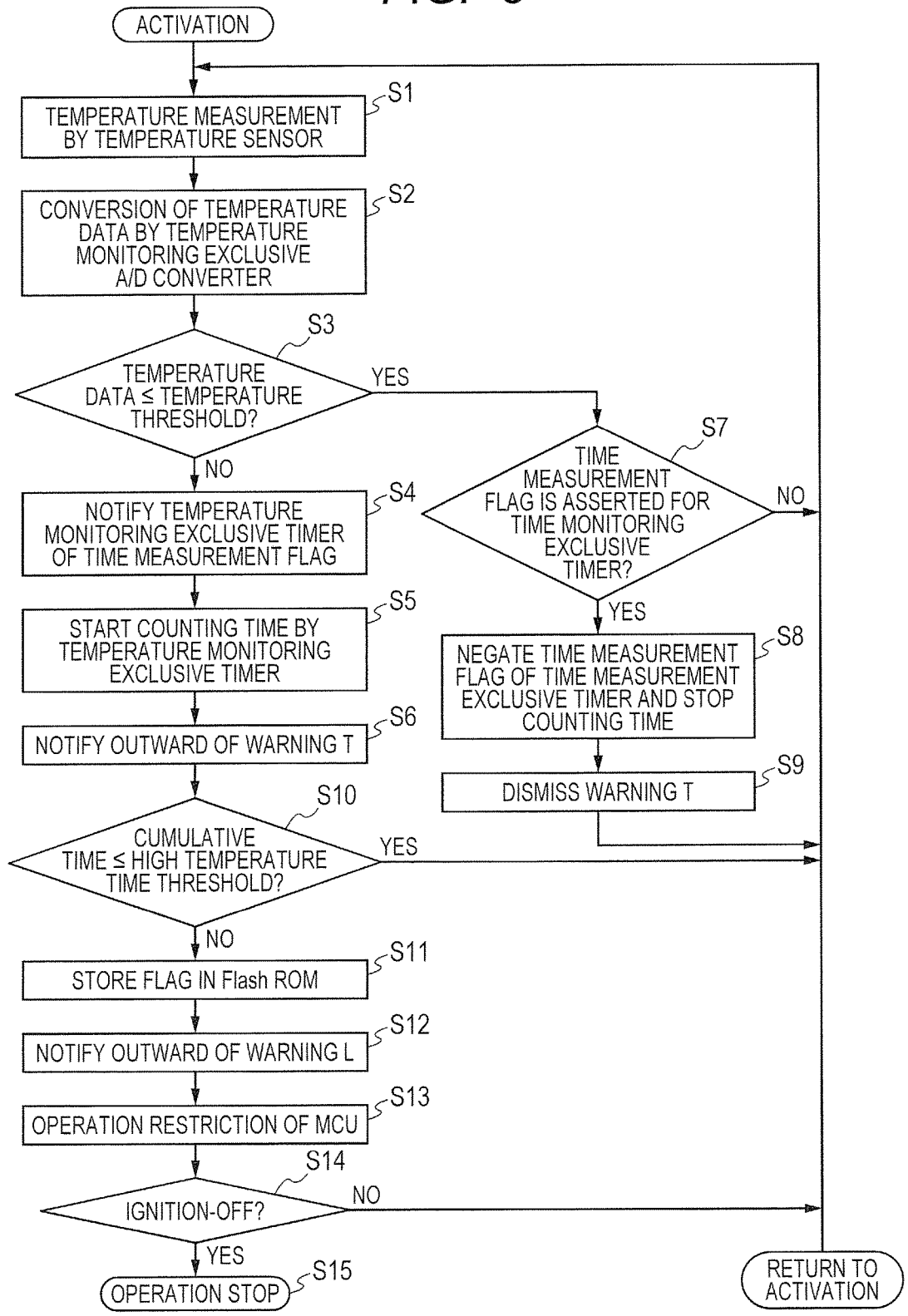
FIG. 3 is a flow chart (former half) showing the operation example of the MCU and the ECU according to the first embodiment.
Figure 4:
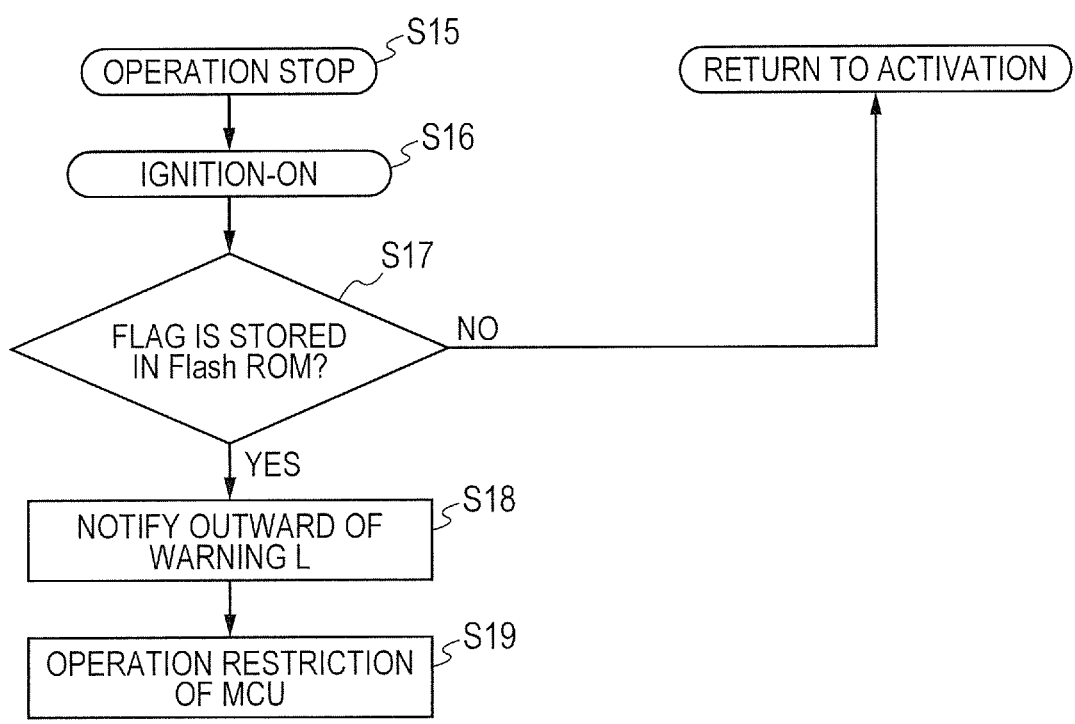
FIG. 4 is a flow chart (latter half) showing the operation example of the MCU and the ECU according to the first embodiment.

FIGS. 3 and 4 are flow charts showing the operation example of the MCU 20 and the ECU 30 at that time. FIG. 3 is the former half and FIG. 4 is the latter half. After the MCU 20 activates, the temperature sensor 1 measures a temperature (S1), and the temperature monitoring exclusive A/D converter 2_2 is used to convert into digital value (S2). The temperature monitoring exclusive comparator T 19 compares the temperature threshold set in the Flash ROM 5 with the A/D converted data (S3), and when detecting a temperature more than the temperature threshold, it asserts a time measurement starting flag for the temperature monitoring exclusive timer 18 (S4). Upon receipt of the flag, the temperature monitoring exclusive timer 18 starts measuring time (S5). Then, prior to S4 or at the same time as S4 or S5, a high temperature detection signal is notified outward through the abnormal output port 9 as the warning T (S6).

The temperature monitoring exclusive comparator T 19 always continues the temperature comparison (S3), and when the measurement temperature is less than the threshold and the time measurement staring flag is asserted for the temperature monitoring exclusive timer 18 (S7), the time measurement flag is negated in the temperature monitoring exclusive timer 18 to stop the time measurement of the temperature monitoring exclusive timer 18 (S8). Simultaneously or before and after this, the high temperature detection signal (warning T) is dismissed from the abnormal output port 1 (S9). On the other hand, when the time measurement staring flag is not asserted for the temperature monitoring exclusive timer 18 (S7), the operation is returned to the temperature measurement by the temperature sensor 1 (S1).

After detecting a temperature more than the temperature threshold and notifying the outside of the warning T (S6), the temperature monitoring exclusive comparator L 3 compares the cumulative period (cumulative time) of exceeding the high temperature threshold counted by the temperature monitoring exclusive timer 18 with the high temperature time threshold stored in the Flash ROM 5 (S10). When the cumulative time exceeds the high temperature time threshold, the cumulative time excessive signal indicating the above can be notified outward through the abnormal output port 9 as the warning L (S12). Further, on detection of the high temperature state, when the cumulative time exceeds the high temperature time threshold, the operation restriction on the MCU 20 can be performed (S13). As one example, even after the ignition-off, since the high temperature operation more than this may affect the reliability of the MCU 20, the MU 20 is activated with the operation of the performance and function thereof restricted, hence to enable a control free from a temperature stress more than this. In this case, a flag stored in the Flash ROM 5 is used to control the operation control unit 14 of controlling the whole operation of the chip (MCU 20). Upon receipt of the flag, the operation control unit 14 restricts the operation of the chip. Specifically, ignition-off or not is determined (S14); in the case of not the ignition-off, the operation is returned to S1, while in the case of the ignition-off, the operation stops (S15). Thereafter, when the ignition is turned on again (S16), whether or not a flag is stored in the Flash ROM 5 is determined (S17); when it is not stored, the operation is returned to S1 (normal activation). On the other hand, when the flag is stored, the warning L is notified outward again (S18), the operation of the MCU 20 is restricted (S19), similarly to the operation restriction of the MCU 20 before the ignition-off (S13).

Based on the notification of the warning L indicating the cumulative time exceeds the high temperature time threshold, a system can be operated by the software at the operation restriction of the MCU 20 considered on the whole ECU 30.

As mentioned above, when the cumulative time exceeds the high temperature time threshold, a reliability assumed as the MCU 20 cannot be assured; therefore, by restricting the operation causing a temperature out of the assurance, a failure can be avoided. Further, the operation state of more than the assured temperature can be logged in on the Flash ROM 5, which can be a means for investigating the cause when there occurs the high temperature operation out of assumption. This is advantageous not only for a maker of the MCU 20 but also for an end user of the ECU 30 who can log in the use condition. The temperature sensor 1 may be formed on the same semiconductor substrate as the MCU 20 according to the same semiconductor manufacturing process. When the temperature sensor is arranged outside of the chip, a temperature to be measured is the atmosphere temperature Ta; on the contrary, when the temperature sensor 1 is formed on the same chip, a joint temperature Tj can be measured more accurately. This is true to every form of embodiments including the embodiments described later.

In the first embodiment, when the temperature measured by the temperature sensor 1 exceeds the temperature threshold, the high temperature detection signal (warning T) is notified and the accumulative measurement of the high temperature time is performed, byway of example. The temperature threshold that may be a criterion for determining whether or not to notify the high temperature detection signal (warning T) and the temperature threshold that may be a criterion for determining whether or not to do the accumulative measurement of high temperature time may be separate values. In this case, for example, instead of one temperature monitoring exclusive comparator 19, a comparator for notifying the high temperature detection signal (warning T) and a comparator for asserting and negating the flag for accumulatively measuring the high temperature time are provided separately.

Second Embodiment

Figure 5:
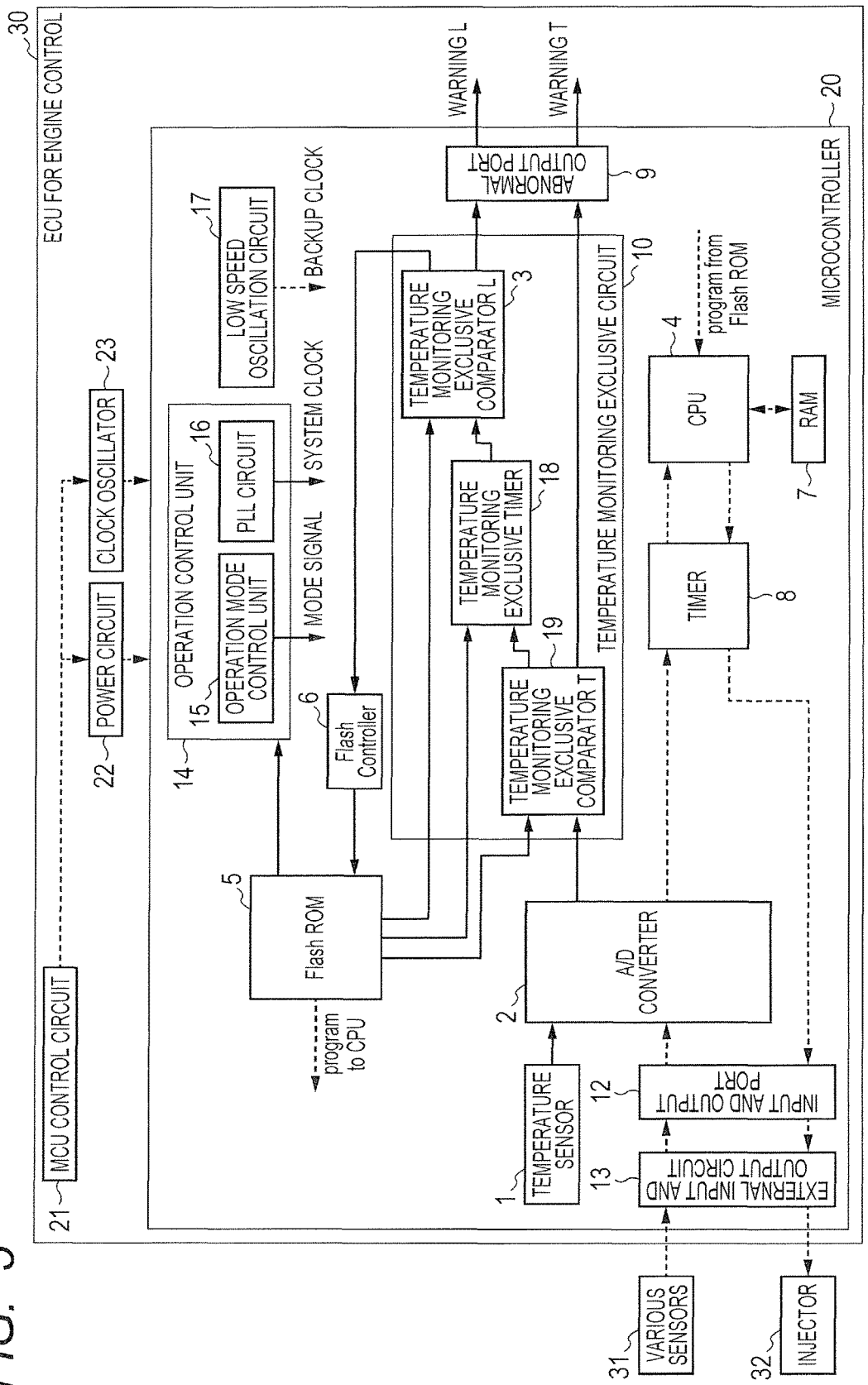
FIG. 5 is a signal flow view showing an operation example of the MCU and the ECU according to a second embodiment.

FIG. 5 is a signal flow view showing an operation example of the MCU 20 and the ECU 30 according to a second embodiment. In the first embodiment, the temperature monitoring exclusive A/D converter 2_2 is provided, hence to enable a full-time monitoring of a temperature. On the other hand, in the second embodiment, instead of the temperature monitoring exclusive A/D converter 2_2, a usual A/D converter 2 that is one of the peripheral circuit modules of the CPU 4 is used to perform the A/D conversion on the measured temperature by the temperature sensor 1. Other structure and operation are the same as those of the first embodiment described using FIG. 2; therefore, the detailed description is omitted.

In the second embodiment, during the operation of the CPU 4, the temperature sensor 1 measures a temperature. The A/D converter 2 performs A/D conversion on the measurement values input from various types of sensors 31, along the flow of the general signal indicated by the dashed arrow, as well as on the temperature measured by the temperature sensor 1 at a time sharing. The A/V conversion of the temperature measured by the temperature sensor 1 may be performed intermittently with a lower priority than that of the A/D conversion on the measurement values input from the sensors 31. That is because generally the temperature changes more gradually compared with the measurement values input from the sensors 31.

According to this, the frequency of the A/D conversion can be reduced and there is no need to use the A/D converter 2_2.

The A/D converted data with a lower priority is notified to the temperature monitoring exclusive comparator T 19 and compared with the temperature threshold set in the Flash ROM 5; when detecting a temperature more than the temperature threshold, a time measurement starting flag is asserted for the temperature monitoring exclusive timer 18. Further, a high temperature detection signal (warning T) is notified outward from the abnormal output port 9. When the accumulative measurement period output from the temperature monitoring exclusive timer 18 exceeds the high temperature time threshold, a cumulative time excessive signal (warning L) is notified outward from the abnormal output port 9. These operations are the same as those of the first embodiment except for being intermittent.

Figure 6:
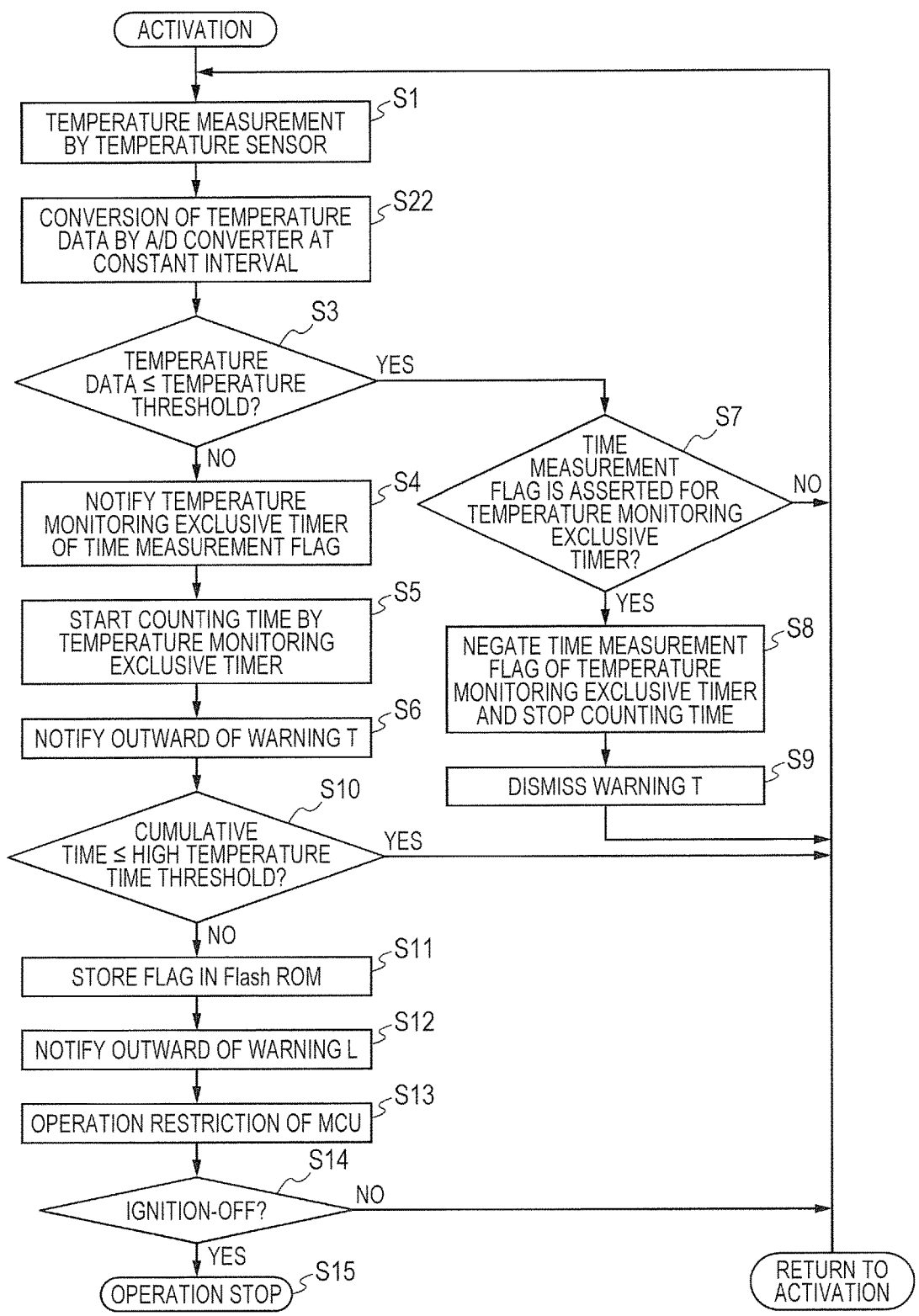
FIG. 6 is a flow chart (former half) showing the operation example of the MCU and the ECU according to the second embodiment.
Figure 7:
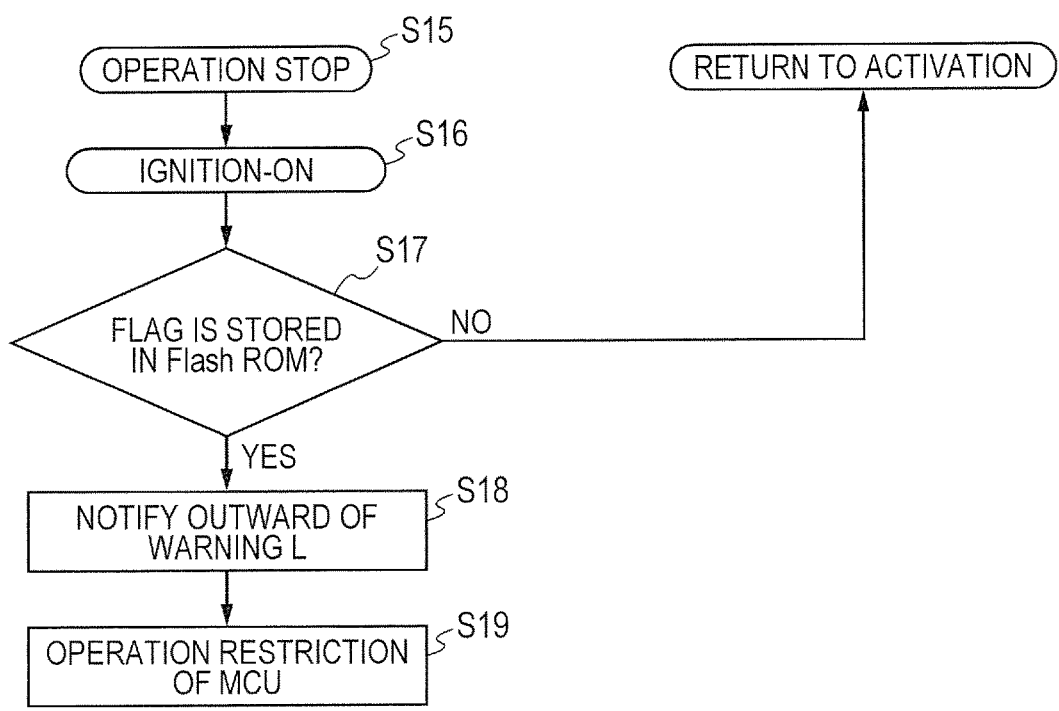
FIG. 7 is a flow chart (latter half) showing the operation example of the MCU and the ECU according to the second embodiment.

FIGS. 6 and 7 are flow charts showing an operation example of the MCU 20 and the ECU 30 at this point; FIG. 6 is the former half and FIG. 7 is the latter half. After activating the MCU 20, the temperature sensor 1 measures the temperature (S1), and the A/D converter 2 converts the above into digital value at a constant interval (S22). The operation later than this is the same as that in the first embodiment shown in FIGS. 3 and 4 and the description is omitted.

In the second embodiment, the temperature measurement (temperature monitoring) that is full-time performed in the first embodiment is set intermittently; as the result, there is no need to have the temperature monitoring exclusive A/D converter 2_2, hence to suppress an increase in the circuit size. Other effects and modified example are the same as in the first embodiment.

Third Embodiment

In a third embodiment, proper MCU 20 and ECU 30 suitable for a vehicle such as a hybrid car with a battery mounted will be described. Even when an engine is not used (engine stop state), in other words, when the engine control ECU 30 does not operate, a hybrid car charges the battery and therefore, a charge controlling portion gets extremely high temperature. A charge control is generally performed by another ECU and another MCU and the MCU 20 mounted on the engine control ECU 30 is generally in a standby state. When there is a heat generation source near the engine controlling ECU 30, even when the mounted MCU 20 is in a standby state, a heat stress is continuously applied to the MCU 20; therefore, in order to assure the reliability of the MCU 20, it is the effective means to obtain the heat history in the standby state.

Figure 8:
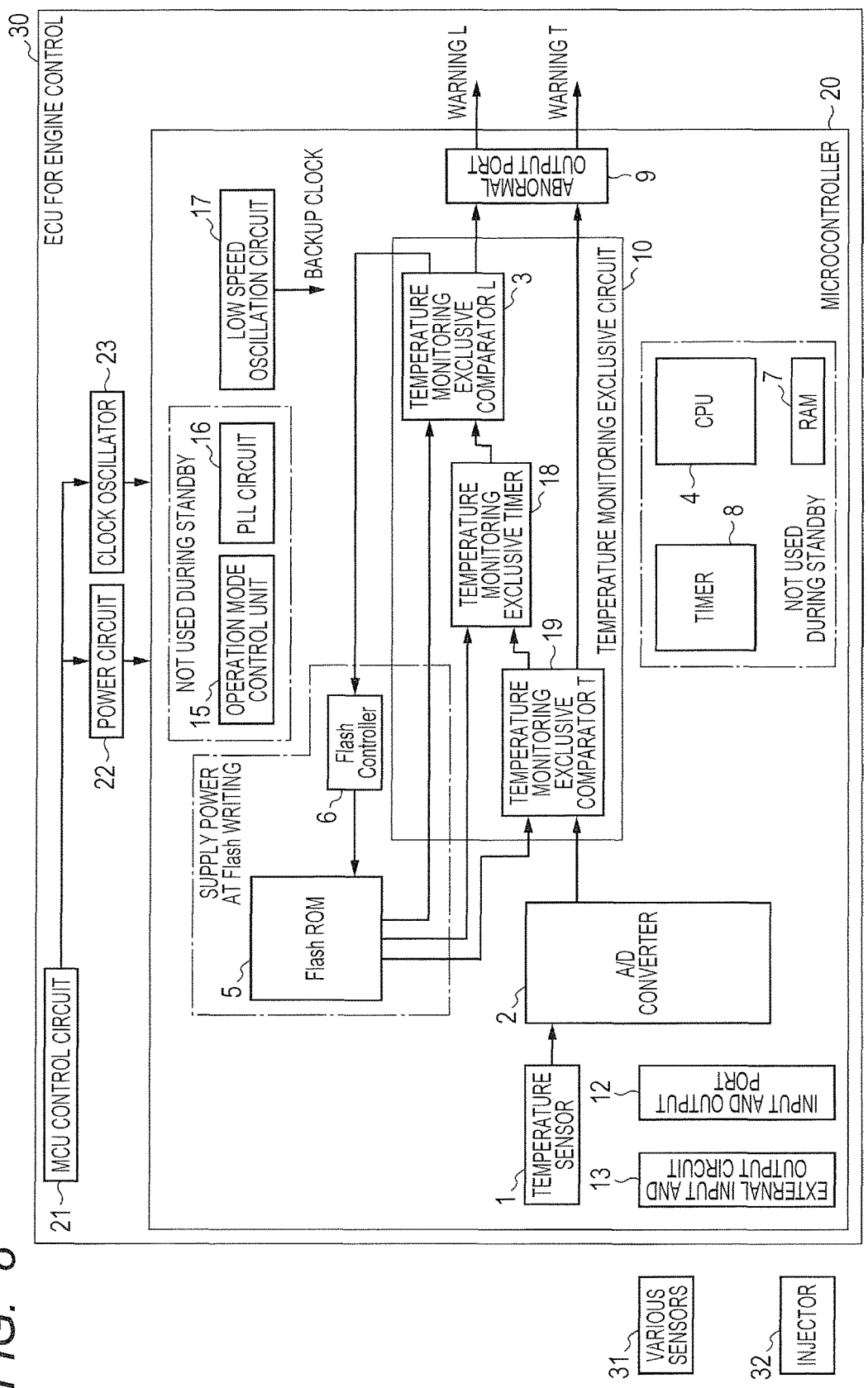
FIG. 8 is a signal flow view showing an operation example of the MCU and the ECU on standby according to a third embodiment.

FIG. 8 is a signal flow view showing an operation example of the MCU 20 and the ECU 30 in a standby state according to the third embodiment. Since the engine is stopped, the CPU 4, the RAM 7, the timer 8, the operation mode control unit 15, and the PLL circuit 16 are not used; as the result, measurement data is not input from various types of sensors 31 and a control signal to the injector 32 is not output. The operation control unit 14 supplies a backup clock from the low speed oscillation circuit 17, instead of a system clock from the PLL circuit 16. Using the timer (not illustrated) of operating with a backup clock, the temperature sensor 1 is operated at a constant interval, to measure a temperature and convert it into digital value by the A/D converter 2. As the timer for measuring a temperature at a constant interval, the timer 8 may be used or an exclusive low speed timer 24 may be provided similarly to FIG. 12 described later.

The measurement value of the temperature converted into digital value is compared with the temperature threshold stored in the Flash ROM 5 by the temperature monitoring exclusive comparator T 19. As the result of the comparison, when the measured temperature exceeds the temperature threshold, a time measurement starting flag is asserted for the temperature monitoring exclusive timer 18. Here, a high temperature detection signal is notified outward through the abnormal output port 9 as the warning T. The temperature monitoring exclusive timer 18 counts the time with the flag being notified, adds the above time to the cumulative time so far supplied from the Flash ROM 5, updates the cumulative time, and notifies the temperature monitoring exclusive comparator L 3 of the updated cumulative time.

When the measured temperature becomes less than the temperature threshold, the temperature monitoring exclusive comparator T 19 negates the time measurement starting flag to stop the measurement of the temperature monitoring exclusive timer 18 and store the cumulative time in the temperature monitoring exclusive comparator L 3. Further, the high temperature detection signal (warning T) from the abnormal output port 9 is dismissed.

The temperature monitoring exclusive comparator L 3 is always comparing the high temperature time threshold stored in the Flash ROM 5 with the cumulative time input from the temperature monitoring exclusive timer 18; when the cumulative time exceeds the high temperature time threshold, the comparator L 3 notifies the MCU control circuit 21 of the cumulative time excessive signal from the abnormal output port 9 as the warning L. The MCU control circuit 21 supplies a power and a clock to the MCU 20 from the power circuit 22 and the clock oscillator 23, to activate the MCU 20. After activation of the MCU 20, a flag indicating the excessive cumulative time is written in the Flash ROM 5 through the Flash control unit 6. After detecting the storing completion of the flag, the CPU 4 notifies the MCU control circuit 21 of a signal from the input and output port 12, and then, the MCU control circuit 21 turns the MCU 20 into a standby state again by controlling the power and the clock.

The flag indicating the excessive cumulative time is the internal information of the MCU 20 corresponding to the warning L (cumulative time excessive signal), indicating that there comes a lifetime soon due to the aged degradation, in other words, that there is a fear of a wear out failure occurring in the near future. When the flag indicating the excessive cumulative time is set, for example, even when the temperature measured by the temperature sensor 1 does not exceed the temperature threshold, the operation of the MCU 20 can be suppressed by means of reducing the frequency of the clock signal supplied to the MCU 20 and by reducing the heat generation by the MCU 20 itself, hence to prolong the time to the actual wear out failure. Further, by storing the flag in the Flash ROM 5, at turning on the ignition again from the engine stop state, the operation of the MCU 20 can be suppressed based on the above flag stored in the Flash ROM 5 and the operation restriction for reducing the heat generation by the MCU 20 itself can be continued. For example, the flag can be read out from the Flash ROM 5, notified the operation control unit 14, and the operation restriction of the MCU 20 can be performed.

Figure 9:
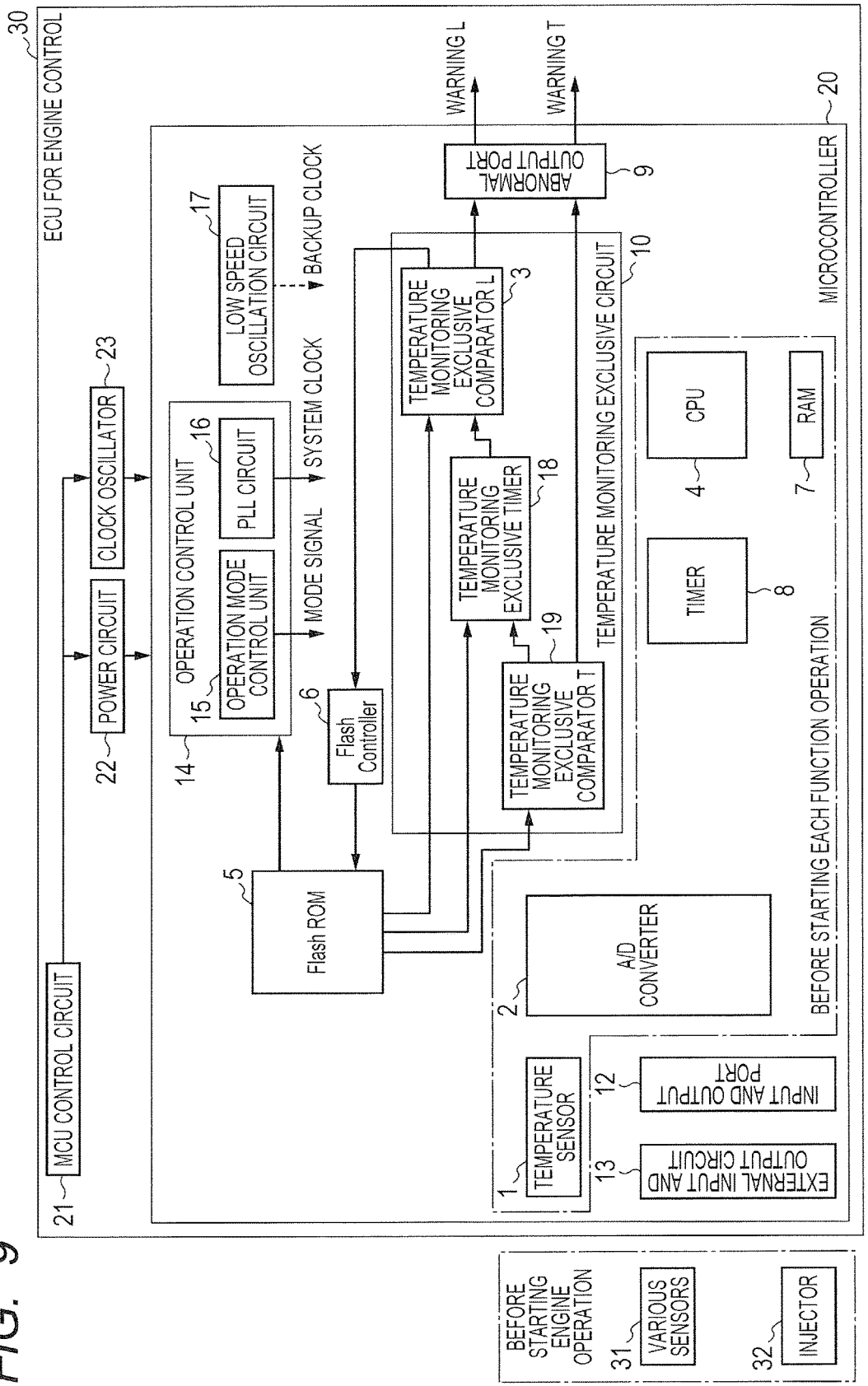
FIG. 9 is a signal flow view showing the operation example of the MCU and the ECU at a restart of the MCU according to the third embodiment.

FIG. 9 is a signal flow view showing the operation example of the MCU 20 and the ECU 30 at the MCU restart. In the signal flow view shown in FIG. 8, the operation control unit 14 resumes the supply of the operation mode signal and the system clock; the various sensors 31 and the injector 32 turn into a state before the engine operation start; the temperature sensor 1, the A/D converter 2, the CPU 4, the RAM 7, and the timer 8 turn into a state before the function operation start; and a power supply to the Flash control unit 6 and the Flash ROM 5 is resumed.

When the flag indicating the excessive cumulative time is set during the standby before the MCU restart and written in the Flash ROM 5, the flag information is read out at the MCU restart and supplied to the operation control unit 14. The operation mode control unit 15 and the PLL circuit 16 output the mode signal and the system clock based on the flag information. In the state with the flag put up, for example, the frequency of the system clock is reduced to suppress the operation of the CPU 4 and the operation restriction for suppressing the heat generation by the MCU 20 itself can be performed.

Figure 10:
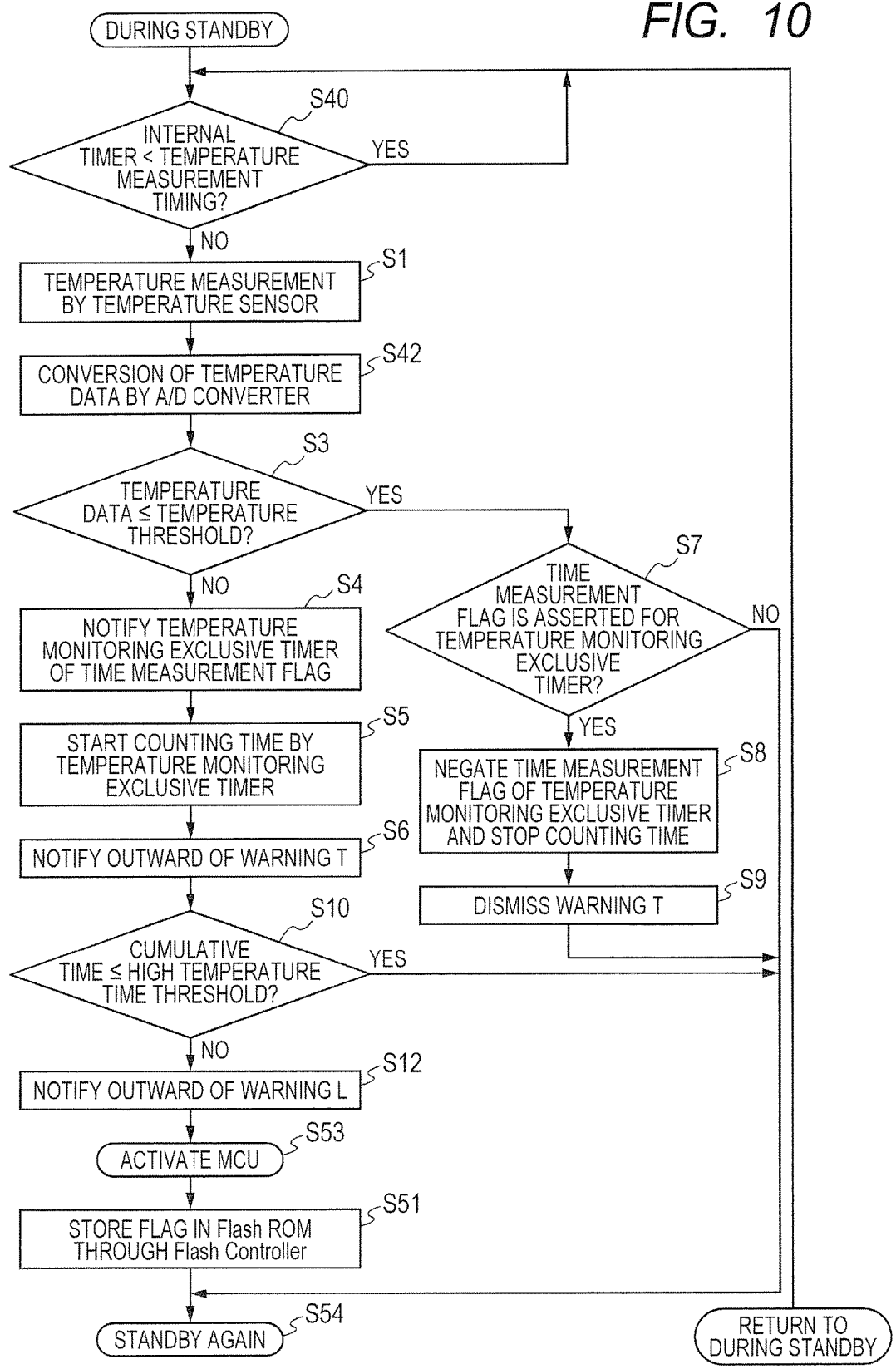
FIG. 10 is a flow chart (former half) showing the operation example of the MCU and the ECU according to the third embodiment.
Figure 11:
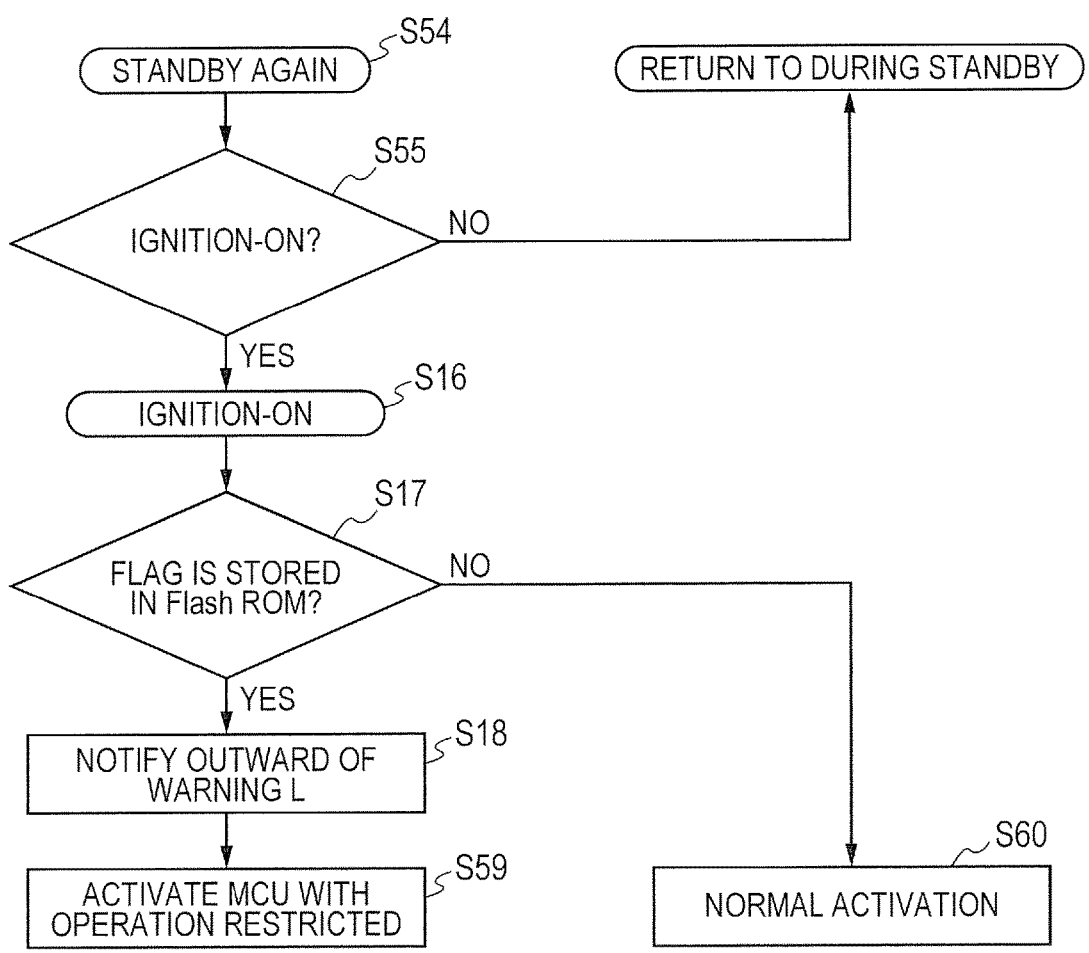
FIG. 11 is a flow chart (latter half) showing the operation example of the MCU and the ECU according to the third embodiment.

FIGS. 10 and 11 are flow charts each showing the operation example of the MCU 20 and the ECU 30 at this point; FIG. 10 indicates the former half and FIG. 11 indicates the latter half. An internal timer counts time (S40) during the standby and the temperature sensor 1 measures a temperature at every temperature measurement timing (S1). The measured temperature data is converted into digital value by the A/D converter 2 (S42). Here, instead of the A/D converter 2, the temperature monitoring exclusive A/D converter 2_2 may be used. The temperature threshold read from the Flash ROM 5 is compared with the A/D converted temperature data by the temperature monitoring exclusive comparator T 19 (S3); when detecting the temperature more than the temperature threshold, the time measurement starting flag is asserted for the temperature monitoring exclusive timer 18 (S4). Upon receipt of the flag, the temperature monitoring exclusive timer 18 starts counting time (S5). Then, before S4, or at the same time as S4 or S5, the high temperature detection signal is notified outward from the abnormal output port 9 as the warning T (S6).

The temperature monitoring exclusive comparator T 19 continues the temperature comparison at a constant cycle by the internal timer (S3); when the measured temperature is less than the threshold and the time measurement starting flag is asserted for the temperature monitoring exclusive timer 18 (S7), the time measurement flag is negated for the temperature monitoring exclusive timer 18 to stop counting time by the temperature monitoring exclusive timer 18 (S8). At the same time or before and after this, the high temperature detection signal (warning T) is dismissed from the abnormal output port 9 (S9). Then, or when the time measurement starting flag is not asserted for the temperature monitoring exclusive timer 18 (S7), it returns to the standby state again (S54).

After detecting the temperature more than the temperature threshold and notifying the outside of the warning T (S6), the temperature monitoring exclusive comparator L 3 compares the accumulated time (cumulative time) exceeding the high temperature threshold counted by the temperature monitoring exclusive timer 18 with the high temperature time threshold stored in the Flash ROM 5 (S10). When the cumulative time exceeds the high temperature time threshold, the cumulative time excessive signal is notified outward through the abnormal output port 9 as the warning L (S12). Then, or in parallel to S12, or before S12, the MCU 20 is activated (S53), and the flag indicating the cumulative time exceeds the high temperature time threshold is stored in the Flash ROM 5 through the Flash control unit 6 (S51). After storing the flag, it returns to the standby state again (S54).

During the standby again (S54), ignition-on or off is determined (S55); unless it is the ignition-on, it returns to S40 in the standby state. In the case of the ignition-on (S16), whether the flag is stored in the Flash ROM 5 or not is determined (S17); when the flag is not stored, it is normally activated (S60). On the other hand, when the flag is stored, the warning L is again notified outward (S18) and the MCU 20 is activated in a restricted operating state (S59).

As mentioned above, in addition to the temperature monitoring enabled during the operation of the MCU 20 corresponding to the engine operation shown in the first and the second embodiments, it is possible to detect the cumulative time exceeding the high temperature time threshold, by accumulatively measuring the period exceeding the temperature threshold also during the standby. According to this, the lifetime of the MCU 20 can be accurately predicted and the warning L can be properly notified.

Fourth Embodiment

Figure 12:
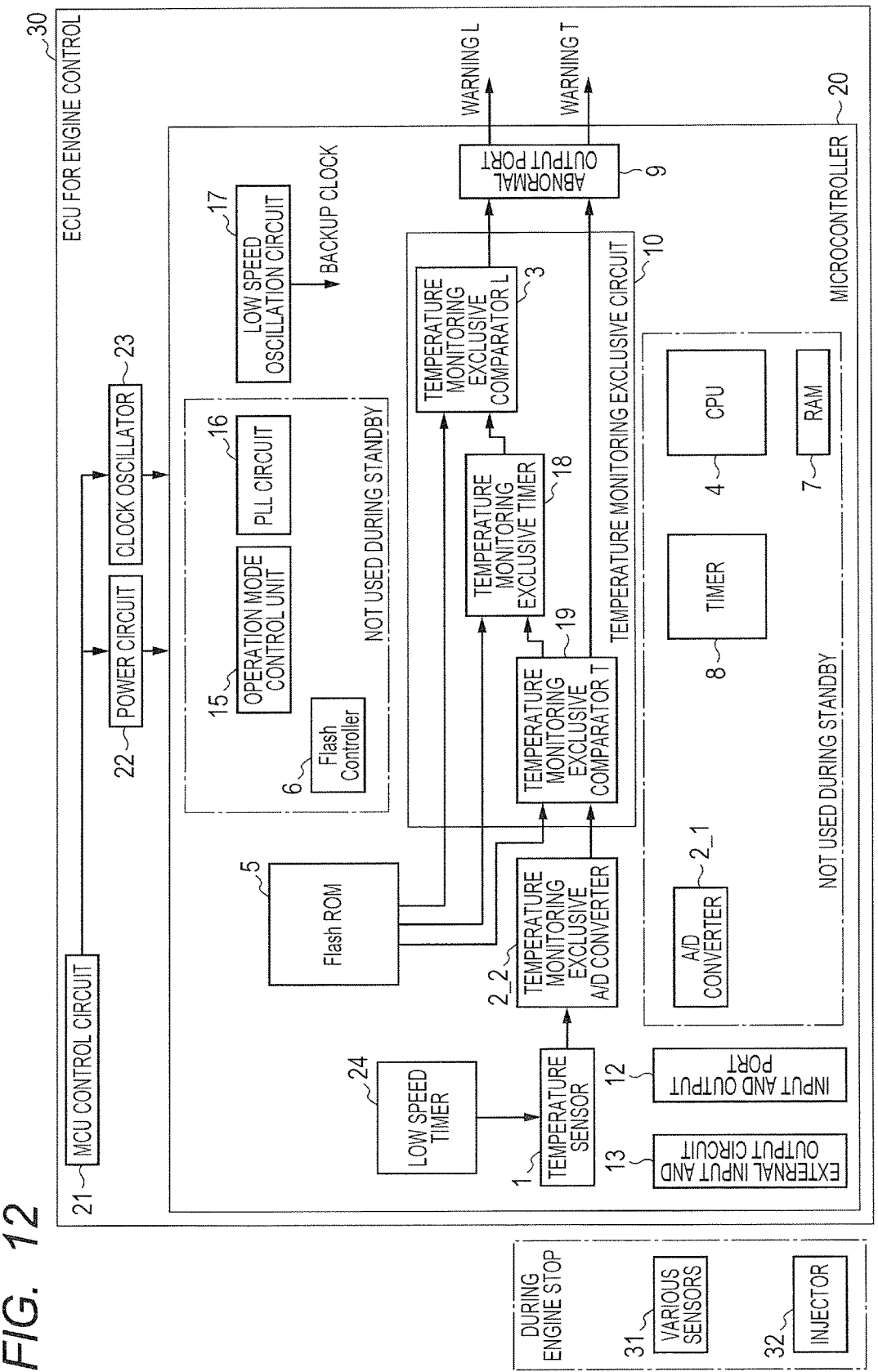
FIG. 12 is a signal flow view showing an operation example of the MCU and the ECU on standby according to a fourth embodiment.
Figure 13:
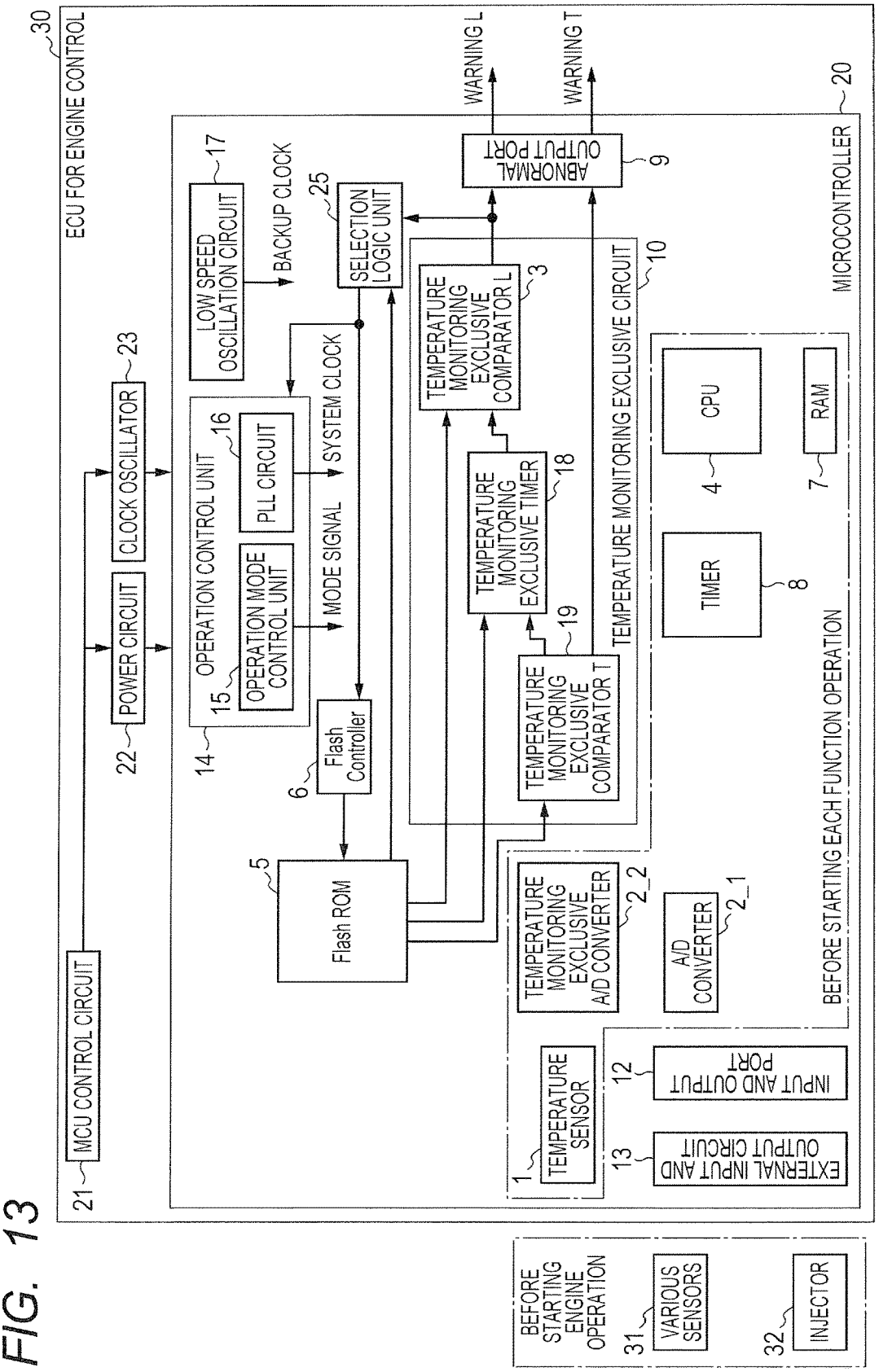
FIG. 13 is a signal flow view showing the operation example of the MCU and the ECU at a restart of the MCU according to the fourth embodiment.

FIGS. 12 and 13 are signal flow views each showing an operation example of the MCU and the ECU according to a fourth embodiment; FIG. 12 shows the operation example in the standby state and FIG. 13 shows the operation example at the MCU restart. In the third embodiment, when detecting the cumulative time exceeding the high temperature time threshold during the standby, the MCU 20 activates to write the flag information into the Flash ROM 5 through the Flash control unit 6. On the contrary, in the fourth embodiment, even when detecting the cumulative time exceeding the high temperature time threshold during the standby, the flag information is not written into the Flash ROM 5 instantly but waiting for the ignition to turn on to restart the MCU 20, it is written into the Flash ROM 5. According to this, an increase in the power consumption during the standby can be suppressed. In order to realize this, the temperature monitoring exclusive comparator L 3 includes a holding area (for example, register) capable of holding the flag information until the MCU 20 restarts. As for the cumulative time with the temperature exceeding the temperature threshold, the temperature monitoring exclusive timer 18 or the temperature monitoring exclusive comparator L 3 similarly includes a holding area (for example, register) capable of holding the information until the MCU 20 restarts and waiting for the restart of the MCU 20, the information may be written into the Flash ROM 5.

In the standby state as shown in FIG. 12, similarly to FIG. 8, the engine is in a stop state, the CPU 4, the RAM 7, the timer 8, the operation mode control unit 15, and the PLL circuit 16 are not used; therefore, measurement data is not input from various types of sensors 31 and a control signal to the injector 32 is not output. The operation control unit 14 supplies a backup clock from the low speed oscillation circuit 17, instead of the system clock from the PLL circuit 16. Further, the A/D converter 2_1 and the Flash control unit 6 are not used either. Differently from FIG. 8, the MCU 20 includes a low speed timer 24 and operates the temperature sensor 1 at a constant interval to measure a temperature. The measured temperature data is converted into digital value by the temperature monitoring exclusive A/D converter 2_2 and input to the temperature monitoring exclusive comparator T 19. To the other input terminal of the temperature monitoring exclusive comparator T 19, the temperature threshold value is input from the Flash ROM 5. As the result of the comparison, when the temperature measured by the temperature sensor 1 exceeds the temperature threshold, a flag is notified the temperature monitoring exclusive timer 18, and at the same time, a high temperature detection signal is notified outward to the MCU control circuit 21 through the abnormal detection port 9 as the warning T. When the temperature measured by the temperature sensor 1 is less than the temperature threshold, the flag is dismissed to stop the measurement operation of the temperature monitoring exclusive timer 18 and cancel the warning T simultaneously.

On the other hand, upon receipt of the flag, the temperature monitoring exclusive timer 18 measures the period (high temperature period) with the flag being notified. The temperature monitoring exclusive timer 18 receives the cumulative time to that point from the Flash ROM 5 and adds the period (high temperature period) with the flag being notified by the temperature monitoring exclusive comparator T 19 to the above accumulatively. The cumulative time with the high temperature period added is input to the temperature monitoring exclusive comparator L 3. To the other input terminal of the temperature monitoring exclusive comparator L 3, the high temperature time threshold is supplied from the Flash ROM 5. When the cumulative time output from the temperature monitoring exclusive timer 18 exceeds the high temperature time threshold, the cumulative time excessive signal is notified outward to the MCU control circuit 21 through the abnormal detection port 9 as the warning L.

Differently from the third embodiment, even when detecting the cumulative time exceeding the high temperature time threshold, the flag information indicating the above is held in the temperature monitoring exclusive comparator L 3, without activating the MCU 20 to be moved to the operation of writing the flag information into the Flash ROM 5. It is the same as for the cumulative time. The cumulative time is successively updated during the period when the measured temperature exceeds the temperature threshold, and the latest value is held in the temperature monitoring exclusive timer 18 or the temperature monitoring exclusive comparator L 3.

FIG. 13 is a signal flow view showing the operation example of the MCU 20 and the ECU 30 when the ignition is turned on again from the engine stop state to restart the MCU 20. In the signal flow view shown in FIG. 12, the supply of the operation mode signal of the operation control unit 14 and the system clock is resumed, the sensors 31 and the injector 32 are turned into the state before the engine operation start, the temperature sensor 1, the A/D converter 2_1, and the temperature monitoring exclusive A/D converter 2_2, the CPU 4, the RAM 7, and the timer 8 are turned into the state before the function operation start, and the power supply to the Flash control unit 6 is resumed.

The MCU 20 is provided with a selection logic unit 25. The selection logic unit 25 may be provided as hardware within the temperature monitoring exclusive circuit 10 or may be mounted as a function of software executed by the CPU 4. When the flag indicating that the cumulative time exceeds the high temperature time threshold is already stored in the Flash ROM 5, the selection logic unit 25 transfers the information to the operation control unit 14, to restrict the operation of the MCU 20. When the flag is not stored in the Flash ROM 5, the cumulative time exceeding the high temperature time threshold is detected during the standby before the MCU restart, and the flag information indicating the above is held in the temperature monitoring exclusive comparator L 3, the selection logic unit 25 reads the flag information from the temperature monitoring exclusive comparator L 3 and supplies the information to the operation control unit 14. In the operation control unit 14, the operation mode control unit 15 and the PLL circuit 16 output the mode signal and the system clock based on the flag information. In the state with the flag put up, for example, the frequency of the system clock is reduced to suppress the operation of the CPU 4 and restrict the heat generation by the MCU 20 itself. In parallel to this, the selection logic unit 25 writes the flag information read from the temperature monitoring exclusive comparator L 3 into the Flash ROM 5 through the Flash control unit 6.

When the cumulative time is held in the temperature monitoring exclusive timer 18 or the temperature monitoring exclusive comparator L 3, the selection logic unit 25 may read and write this into the Flash ROM 5 through the Flash control unit 6.

Figure 14:
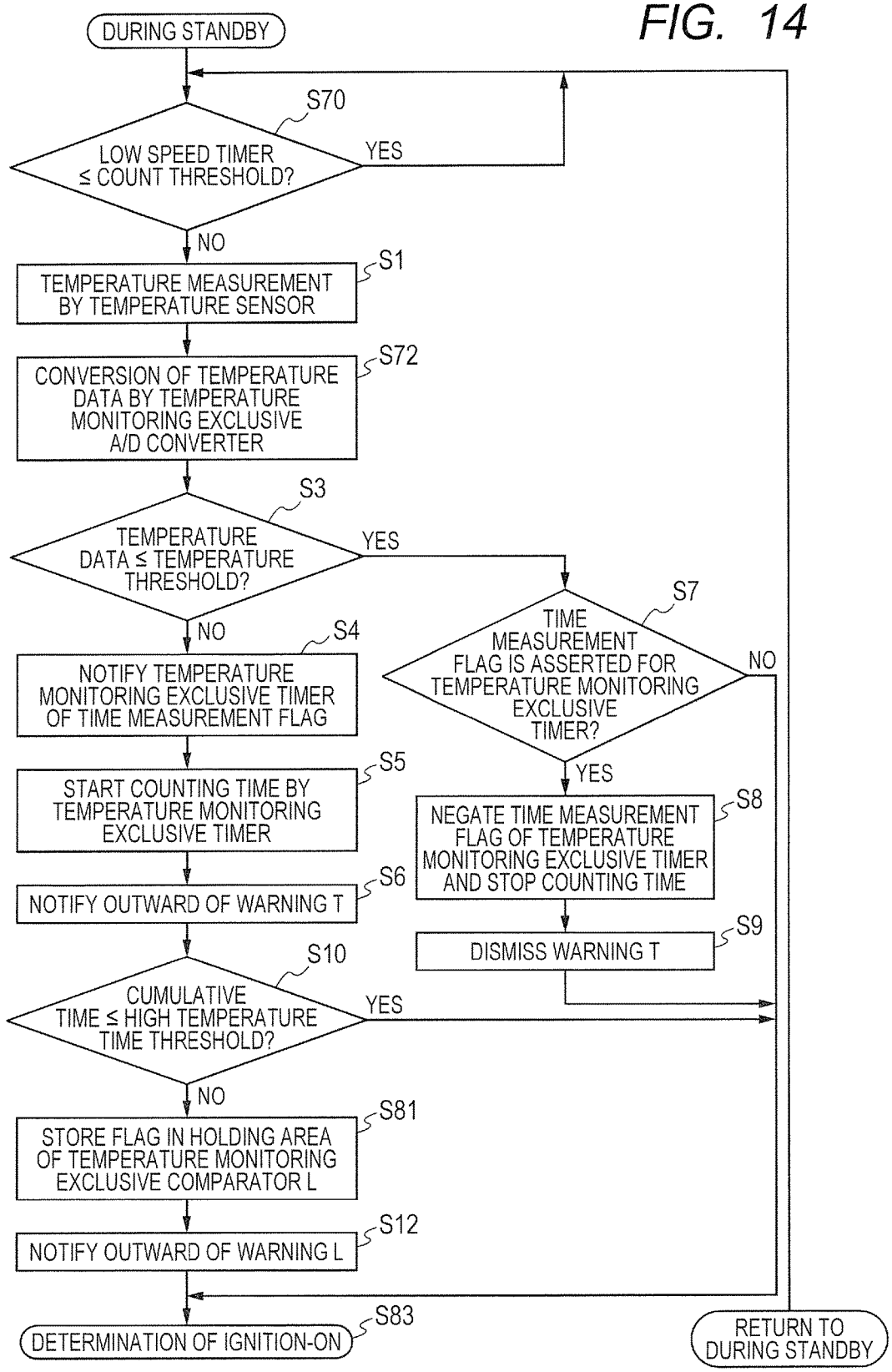
FIG. 14 is a flow chart (former half) showing the operation example of the MCU and the ECU according to the fourth embodiment.
Figure 15:
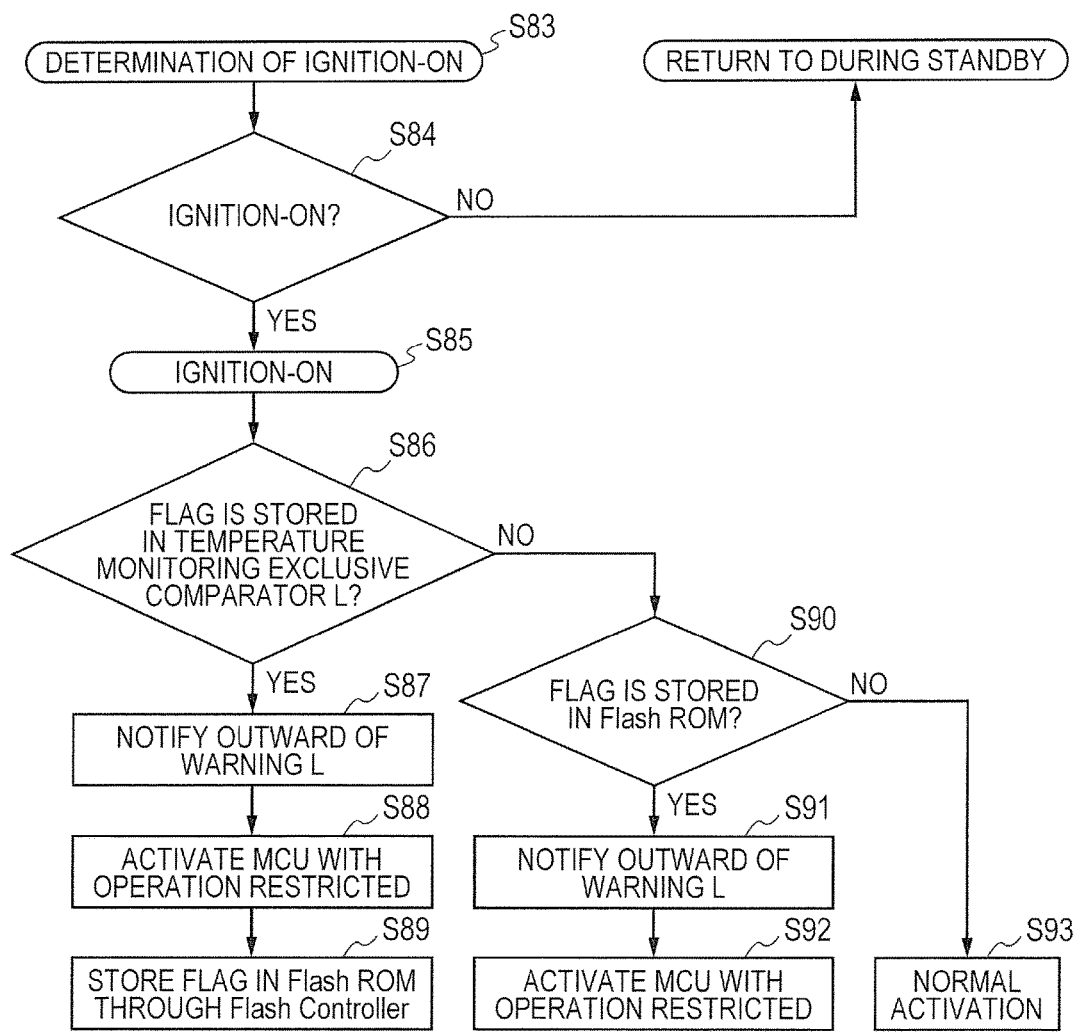
FIG. 15 is a flow chart (latter half) showing the operation example of the MCU and the ECU according to the fourth embodiment.

FIGS. 14 and 15 are flow charts each showing the operation example of the MCU 20 and the ECU 30 at this point; FIG. 14 is the former half and FIG. 15 is the latter half. During the standby, the low speed timer 24 performs counting (S70), and the temperature sensor 1 measures the temperature at every time of exceeding the threshold (S1). The measured temperature data is converted into digital value by the temperature monitoring exclusive A/D converter 2_2 (S72). The temperature threshold read from the Flash ROM 5 is compared with the A/D converted temperature data by the temperature monitoring exclusive comparator T 19 (S3); when detecting the temperature more than the temperature threshold, the time measurement starting flag is asserted for the temperature monitoring exclusive timer 18 (S4). Upon receipt of the flag, the temperature monitoring exclusive timer 18 starts counting time (S5). Then, before S4 or at the same time as S4 or S5, a high temperature detection signal is notified outward from the abnormal output port 9 as the warning T (S6).

The temperature monitoring exclusive comparator T 19 continues the temperature comparison by the low speed timer 24 at a constant cycle (S3); when the measured temperature is less than the threshold and the time measurement starting flag is asserted for the temperature monitoring exclusive timer 18 (S7), the time measurement flag is negated in the temperature monitoring exclusive timer 18 to stop the time measurement of the temperature monitoring exclusive timer 18 (S8). At the same time or before and after this, the high temperature detection signal (warning T) from the abnormal output port 1 is dismissed (S9). Then or when the time measurement starting flag is not asserted for the temperature monitoring exclusive timer 18 (S7), the operation is moved to the step for determination of ignition-on (S83).

After the warning T is notified outward with the temperature more than the temperature threshold detected (S6), the accumulative period (cumulative time) of exceeding the high temperature threshold counted by the temperature monitoring exclusive timer 18 is compared with the high temperature time threshold stored in the Flash ROM 5 by the temperature monitoring exclusive comparator L 3 (S10). When the cumulative time exceeds the high temperature time threshold, the flag indicating the above is stored in the holding area (register) within the temperature monitoring exclusive comparator L 3 (S81). Then or in parallel to this or before this, the cumulative time excessive signal is notified outward through the abnormal output port 9 as the warning L (S12). Then, the operation is moved to the ignition-on determination (S83) while being in the standby state.

The ignition-on or not is determined (S84), and in the case of not the ignition-on, it is returned to S70. In the case of the ignition-on (S85), whether or not the flag is stored in the temperature monitoring exclusive comparator L 3 is determined (S86). As the result, when the flag is stored in the temperature monitoring exclusive comparator L 3, the warning L is notified outward (S87), the MCU 20 is activated with its operation restricted (S88), and the flag indicating that the cumulative time exceeds the high temperature time threshold is stored in the Flash ROM 5 through the Flash control unit 6 (S89). On the other hand, as the result of the determination in S86, when the flag is not stored in the temperature monitoring exclusive comparator L 3, whether or not the flag is stored in the Flash ROM 5 is determined (S90), and when the flag is not stored there, the MCU 20 is activated normally (S93). On the other hand, when the flag is stored there, the warning L is notified outward again (S91), the MCU 20 is activated with its operation restricted (S92).

As mentioned above, differently from the third embodiment, writing into the Flash ROM 5 is not performed during the standby and therefore, it is possible to monitor the temperature at a low power consumption.

Although the illustration is omitted in FIGS. 14 and 15, the cumulative time before arriving at the high temperature time threshold is rewritten and held in the Flash ROM 5. As for this, the cumulative time updated during the standby is held in the holding area (register) within the temperature monitoring exclusive timer 18 or the temperature monitoring exclusive comparator L 3 and rewritten in the Flash ROM 5 at the restart of the MCU 20.

Alternatively, while holding the flag, detecting the cumulative time exceeding the high temperature time threshold during the standby state, in the holding area (register) within the temperature monitoring exclusive comparator L 3 and holding the cumulative time updated during the standby in the holding area (register) within the temperature monitoring exclusive timer 18 or the temperature monitoring exclusive comparator L 3, there is a case of turning off the power of the ECU 30 without turning on the ignition. Also in this case, in order to avoid losing the held information, the MCU 20 should be intermittently activated to write the information including the flag and the cumulative time held in the holding area into the Flash ROM 5. Alternatively, after detecting a user's operation of turning off the power to the ECU 30, the information such as the flag and the cumulative time held in the holding area may be preferably written into the Flash ROM 5 before actually stopping the power supply to the ECU 30.

As mentioned above, although the invention made by the inventor et al. has been concretely described according to the embodiments, it is needless to say that the invention is not restricted to these but that various modifications are possible in the range without departing from its spirit.

For example, as one example of a non-volatile memory, Flash ROM is used but any other non-volatile memory may be used. The flag indicating that the cumulative time exceeds the high temperature time threshold is never dismissed when it is once detected, and therefore, it may be written in a ROM of once writable fuse format.

What is claimed is:

1. A semiconductor integrated circuit provided with a processor, comprising:
    a temperature sensor, a non-volatile memory, and a comparator formed on the same semiconductor substrate as the processor,
    wherein the comparator compares a temperature measured by the temperature sensor with a predetermined temperature threshold, and
    wherein the non-volatile memory accumulatively holds information about a period in which the temperature exceeds the temperature threshold, based on the comparison result by the comparator, and
    wherein when a cumulative value of the period exceeds a predetermined high temperature time threshold, a warning is notified outside of the semiconductor device.

2. The semiconductor integrated circuit according to claim 1, further comprising:
    an analog/digital converter and a timer formed on the semiconductor substrate,
    wherein the analog/digital converter converts the temperature measured by the temperature sensor into a digital value and supplies the value to the comparator,
    wherein the information held in the non-volatile memory is a cumulative period in which the temperature exceeds the temperature threshold, and
    wherein the timer counts a period in which the temperature exceeds the temperature threshold, and
    wherein the cumulative period held in the non-volatile memory is updated using the period.

3. The semiconductor integrated circuit according to claim 2, further comprising:
    a low speed clock circuit formed on the semiconductor substrate,
    wherein the low speed clock circuit supplies an operation clock to the analog/digital converter and the timer also when the processor is in a stop state.

4. The semiconductor integrated circuit according to claim 3, further comprising:
    a low speed timer formed on the semiconductor substrate,
    wherein the low speed timer, upon receipt of the operation clock from the low speed clock circuit, intermittently operates the analog/digital converter and the timer.

5. The semiconductor integrated circuit according to claim 4,
    wherein the cumulative period held in the non-volatile memory is updated using the period intermittently by the low speed timer.

6. The semiconductor integrated circuit according to claim 4,
    wherein the semiconductor integrated circuit reads the cumulative period held in the non-volatile memory intermittently by the low speed timer, updates the cumulative period using the period, and holds the updated cumulative period,
    wherein the processor writes back the updated cumulative period into the non-volatile memory after returning to a normal state from a stop state.

7. The semiconductor integrated circuit according to claim 6, further comprising:
    a memory circuit formed on the semiconductor substrate,
    wherein the memory circuit holds the updated cumulative period, and
    wherein when the cumulative period is updated during the stop state, the processor writes back the updated cumulative period held in the memory circuit, into the non-volatile memory after returning to the normal state from the stop state.

8. The semiconductor integrated circuit according to claim 2,
    wherein when the processor is in a normal operation state, the analog/digital converter converts the temperature measured by the temperature sensor into digital value, during a period different from a period used for the normal operation by the processor.

9. An electronic control unit provided with a microcontroller,
    wherein the microcontroller includes a processor, a temperature sensor, a non-volatile memory, and a comparator,
    wherein the comparator compares a temperature measured by the temperature sensor with a predetermined temperature threshold, and
    wherein the non-volatile memory accumulatively holds information about a period in which the temperature exceeds the temperature threshold, based on the comparison result by the comparator,
    wherein when a cumulative value of the period exceeds a predetermined high temperature time threshold, a warning is notified outside of the electronic control unit.

10. The electronic control unit according to claim 9,
    wherein the microcontroller further includes an analog/digital converter and a timer,
    wherein the analog/digital converter converts the temperature measured by the temperature sensor into digital value and supplies the value to the comparator,
    wherein the information held in the non-volatile memory is a cumulative period in which the temperature exceeds the temperature threshold,
    wherein the timer counts a period in which the temperature exceeds the temperature threshold, and
    wherein the microcontroller updates the cumulative period using the period.

11. The electronic control unit according to claim 10,
wherein the microcontroller further includes a low speed clock circuit,
wherein the low speed clock circuit supplies an operation clock to the analog/digital converter and the timer also when the processor is in a stop state.

12. The electronic control unit according to claim 11,
wherein the microcontroller further includes a low speed timer,
wherein the low speed timer, upon receipt of the operation clock from the low speed clock circuit, intermittently operates the analog/digital converter and the timer.

13. The electronic control unit according to claim 12,
wherein the microcontroller updates the cumulative period held in the non-volatile memory using the period intermittently by the low speed timer.

14. The electronic control unit according to claim 12,
wherein the microcontroller reads the cumulative period held in the non-volatile memory intermittently by the low speed timer, updates the cumulative period using the period, and holds the updated cumulative period, and
wherein the processor writes back the updated cumulative period into the non-volatile memory after returning to a normal state from a stop state.

15. The electronic control unit according to claim 14,
wherein the microcontroller further includes a memory circuit,
wherein the memory circuit holds the updated cumulative period, and
wherein when the cumulative period is updated during the stop state, the processor writes back the updated cumulative period held in the memory circuit, into the non-volatile memory after returning to the normal state from the stop state.

16. The electronic control unit according to claim 10,
wherein when the processor is in a normal operation state, the analog/digital converter converts the temperature measured by the temperature sensor into digital value, during a period different from a period used for the normal operation by the processor.

* * * * *